United States Patent Office 3,546,114
Patented Dec. 8, 1970

3,546,114
OZONATION OF INDUSTRIAL WASTE WATER
Max R. Dietz and Charles R. Moller, Jr., Fremont, Mich., assignors to Gerber Products Company, Fremont, Mich.
No Drawing. Filed Feb. 24, 1969, Ser. No. 801,827
Int. Cl. C02b 1/38
U.S. Cl. 210—63                                                    4 Claims

ABSTRACT OF THE DISCLOSURE

A process for sterilizing industrial waste water so that it will be suitable for reuse, through the introduction of ozone. Sterilization is accomplished even though the industrial waste water is maintained at elevated temperatures and under alkaline conditions.

---

This invention relates to a process for treating industrial plant waste water to make it suitable for reuse in washing containers intended for packaging commestibles for human consumption.

In the packaging of commestibles in hermetically sealed containers, such as glass jars and metal cans, the containers must be cleaned prior to initial use. Common practice in the industry involves a thorough washing with a hot aqueous solution prior to their being filled with the comestibles. Because of the difficulty of sterilizing the resulting hot contaminated solution, the wash water has not heretofore been recycled for reuse but has been disposed of and fresh water continually introduced to the washing operation. Of course, large amounts of, for example, steam are needed to heat the fresh water. Thus, present practice not only results in the dissipation of large quantities of water but in the attendant loss of the energy potential of the hot solution.

It has now been found that when ozone is added to contaminated industrial plant waste water in an amount as little as 15 parts per million, the resulting treated water is rapidly purified so that it conforms to standards established by the American Public Health Association for potable water. In fact, the treated water has been found to be devoid of bacteria and odor while significantly reducing color and turbidity. For this reason, it is suitable for reuse in cleaning containers utilized in packaging comestibles to be consumed by infants as well as adults. Although ozone, a high-energy allotropic form of the element oxygen, is known to readily oxidize many of the compounds which give contaminated water its bad taste and odor and has heretofore been employed in the treatment of sewage and for purifying drinking water, it has not been employed for commercially sterilizing industrial plant waste water.

In a further aspect of this invention, the use of ozone has been found to be particularly advantageous for the in situ regeneration of hot, alkaline industrial plant waste water, even while the water is maintained at elevated temperatures in excess of 120° F. and under alkaline conditions above a pH of 7.0, wherein ozone would normally be expected to be rapidly destroyed and ineffective for even limited purification. It will be apparent to one skilled in this art that these conditions present the greatest practical advantage as the water does not have to be cooled prior to ozonation and then reheated. In still another aspect of the invention, it has now been found that ozone actually destroys any soap residues that might otherwise accumulate in the wash water following the commercial sterilizing operation.

In previous commercial applications of ozone to bacterial control, it was thought that it was necessary for the treated material, whether it be sewage or drinking water, to exhibit an ozone excess, i.e., a residual, to ensure that the prescribed reduction in level of bacterial concentration would be attained. However, in a preferred aspect of this invention, i.e., where about 15 parts per million (p.p.m.) of ozone is introduced into the hot alkaline water, it has been found that the bacteria count is actually reduced and in most instances, completely eliminated, in spite of a lack of any perceptible ozone residual. Lack of residual ozone has the additional advantage of reducing the ultimate corrosion potential of the sterilized water when compared to chlorine-containing solutions which are known to be highly corrosive.

The process of this invention is useful for treating all types of industrial waste water including, for example, drum dryer condensate, air compressor cooling water, as well as recycled jar wash water. The process, as hereinafter described in more detail, has been found to substantially eliminate all bacteria(s) including coliforms, thermophiles and flat sour spores as demonstrated by accepted plate count methods. In addition, the turbidity, color and threshold odor number are well within the aforementioned standards as established by the American Public Health Association (APHA), when they were well above these standards prior to treatment.

Ozone can be generated with any of the commercially available devices, most of which utilize the procedure of passing cooled, dried gaseous oxygen or air through a high voltage, alternating current electric discharge. Commercial ozone generators are of two types the concentric tube and the plate type, both of which are described in detail in the McGraw-Hill Encyclopedia of Science and Technology, McGraw Hill Inc., 1966, vol. 9, p. 479. Good results have been obtained with ozonators manufactured by the Welsbach Corporation.

As used herein, the term "sterilized" is intended to include water suitable for human consumption. From a practical point of view, the amount of ozone necessary to accomplish substantially complete sterilization need not exceed 15 p.p.m. However, higher concentrations can be employed if desired, although in the presence of a hot aqueous solution, little if any residual ozone has been found to remain even after a brief holding period. The holding period necessary to accomplish the required sterilization will depend on a number of factors including, among others, concentration of contaminate, pH, temperature, and rate of ozone introduction.

In carrying out the process of this invention it has been found desirable to first filter the industrial waste water and thereafter subject it to ozonation. Additional filtering may also be desirable, as well as slight reheating, subsequent to ozonation, but prior to reuse as bottle wash water. For purposes of clarity of discussion, the remainder of this application will be directed to the sterilization of a hot alkaline, detergent containing solution to be employed for washing glass baby food jars. However, it will be appreciated by those skilled in this art that the general concept of this invention can be directed to an aqueous cleaning solution utilized with any type of container where sterilized conditions are necessary or desirable.

To further illustrate the novel process of this invention, the following example is provided. It should be understood that the details thereof are not to be regarded as limitations as they may be varied as will be understood by one skilled in this art.

EXAMPLE

Various streams of hot industrial plant waste water were passed through a primary filter having 75 micron openings and directed to a 20,000 gallon holding tank into which ozone produced by a Welsbach model CP–34–

D18 ozone generator was also discharged. The average temperature was about 160° F. At a setting of 75, the ozone generator produced about 19.8 pounds of ozone per 24-hours period. The residence time was calculated to be about 2¼ hours. Ninety (90) gallons per minute of the waste water were removed from the tank and passed through a second primary filter having 75 micron openings and thereafter through a secondary filter having 10 micron openings. The water was thereafter re-heated from the residual 160° F. to approximately 170 to 190° F. and conveyed for reuse in the washing of glass jars.

The water being treated was reclaimed from the jar washing operations as well as condensate from cereal dryers, compressors and the like. The resulting treated water was found to be devoid of a residual ozone concentration; have a turbidity of 0 to 2 (APHA maximum being 15); have a color reading of less than 10 (on a scale where the APHA maximum is 15); present no odor; and exhibit totally negative counts with regard to the presence of bacteria. The water was found to be sterile with respect to all the tests prescribed by the APHA.

Other ozonation treatments were conducted under the following conditions:

TABLE I

| | Ozone production pounds/ 24 hours | Residence time, hours |
|---|---|---|
| Flow rate, gallons per minute: | | |
| 30 | 12.4 | 5½-11 |
| 60 | 13.2 | 2¾-5 |
| 90 | 17.0 | 1¾-3½ |

In each case, the resulting treated water exhibited the prescribed standards of sterilization.

Although the foregoing invention has been described in some detail by way of illustration and example for purposes of clarity of understanding, it will be appreciated that certain changes and modifications may be practiced within the scope of the invention as limited only by the scope of the appended claims.

What is claimed is:

1. A process for treating hot alkaline industrial waste water with ozone, so that the water will be suitable for subsequent reuse in the cleaning of glass containers to be employed for packaging comestible for human consumption, comprising the steps of: filtering said waste water; introducing into said filtered waste water ozone, in a concentration of about 15 parts per million, while maintaining said waste water at a temperature in excess of about 160° F., so as to commercially sterilize the water.

2. A process in accordance with claim 1 wherein said waste water contains a soap residue and the amount of said ozone is sufficient to destroy said residue.

3. A process in accordance with claim 1 wherein said ozonated water is subjected to a second filtration.

4. A process in accordance with claim 1 wherein said waste water is recycled jar wash water, cereal dryer condensate, air compressor cooling water, and heater condensate.

References Cited

UNITED STATES PATENTS

| 2,162,809 | 6/1939 | Groak et al. | 210—167X |
| 3,448,045 | 6/1969 | Hess et al. | 210—63 |

OTHER REFERENCES

Gurnham, C. F., Principles of Industrial Waste Treatment, 1955, John Wiley & Sons, New York, pp. 6, 7, 72, 73, 113 and 207–209 relied on (copy in GP. 176).

MICHAEL E. ROGERS, Primary Examiner

U.S. Cl. X.R.

134—10